Oct. 6, 1942.     J. F. JOY     2,297,707
MECHANICAL MOVEMENT
Original Filed Feb. 14, 1940     2 Sheets-Sheet 1

Inventor:
Joseph F. Joy.
by
Louis A. Maxom.
Atty.

Oct. 6, 1942.                J. F. JOY                2,297,707
                        MECHANICAL MOVEMENT
              Original Filed Feb. 14, 1940    2 Sheets-Sheet 2
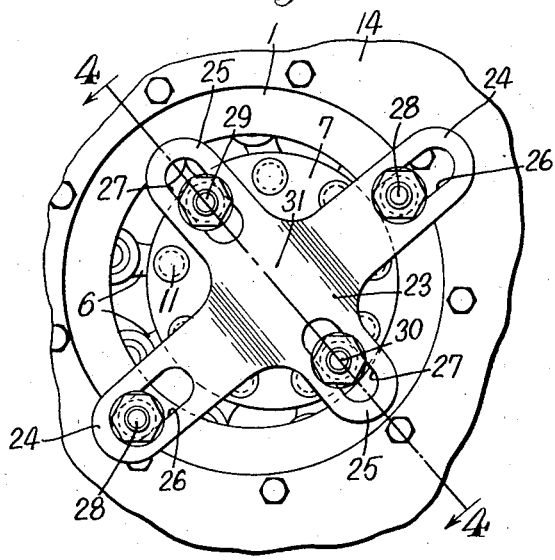
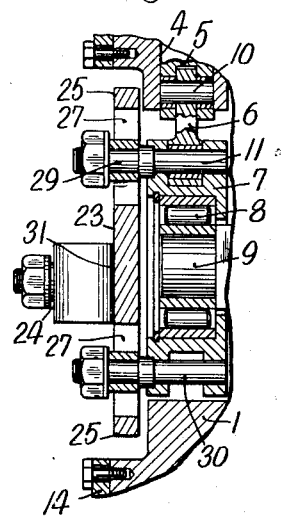
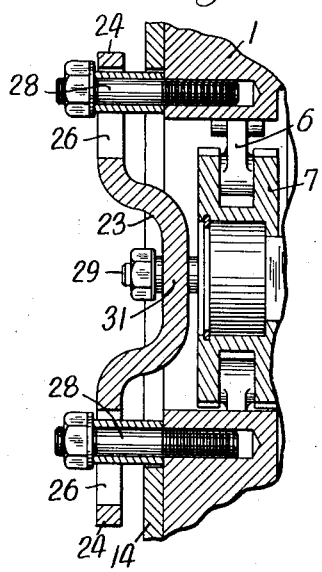
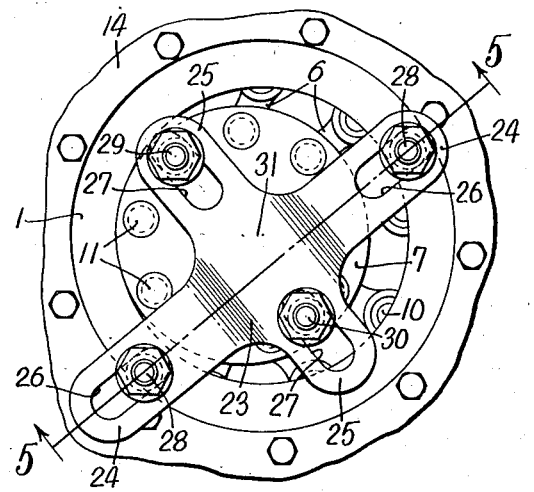
*Inventor:*
*Joseph F. Joy.*
by
Louis A. Maxon.
atty.

Patented Oct. 6, 1942

2,297,707

UNITED STATES PATENT OFFICE 2,297,707

MECHANICAL MOVEMENT

Joseph F. Joy, Franklin, Pa., assignor to Sullivan Machinery Company, a corporation of Massachusetts Original application February 14, 1940, Serial No. 190,413. Divided and this application July 31, 1940, Serial No. 348,849

9 Claims. (Cl. 74—51)

This invention relates to mechanical movements, and more particularly to improved means associated with a crank and the connecting rods operatively connected therewith whereby the angularity of the connecting rods is effectively controlled in an improved manner. From another aspect, it relates to radial cylinder, cylinder and piston apparatus, such as motors and pumps.

An object of the present invention is to provide an improved mechanical movement. Another object is to provide an improved cylinder and piston mechanism having improved connecting rod means. A further object is to provide in a cylinder and piston apparatus of the radial cylinder, reciprocating piston type, a device associated with a crank to which the connecting rods are connected, for causing each connecting rod to move through an angle that is at least approximately bisected by the line containing the axis of the piston actuated by such connecting rod, and to cause the ends of the connecting rods connected to the said device to traverse circles of the same diameter as the circle which the crank pin axis traverses, whereby the angular movement of the connecting rods is effectively controlled in an improved manner. Still a further object of the invention is to provide in a radial cylinder apparatus an improved construction in which extreme compactness may be obtained. These and other objects will, however, hereinafter more fully appear.

This application is a division of my copending application Serial No. 190,413, filed Feb. 14, 1938, which has become abandoned.

In the accompanying drawings there is shown for purposes of illustration one form which the invention may assume in practice.

In these drawings:

Fig. 3 is a fragmentary end elevational view of the pump, illustrating the improved connecting rod controlling means.

Fig. 4 is a detail sectional view taken substantially on line 4—4 of Fig. 3.

Fig. 5 is a detail sectional view taken substantially on line 5—5 of Fig. 6.

Fig. 6 is a view similar to Fig. 3, showing parts in a different position.

Figure 1:
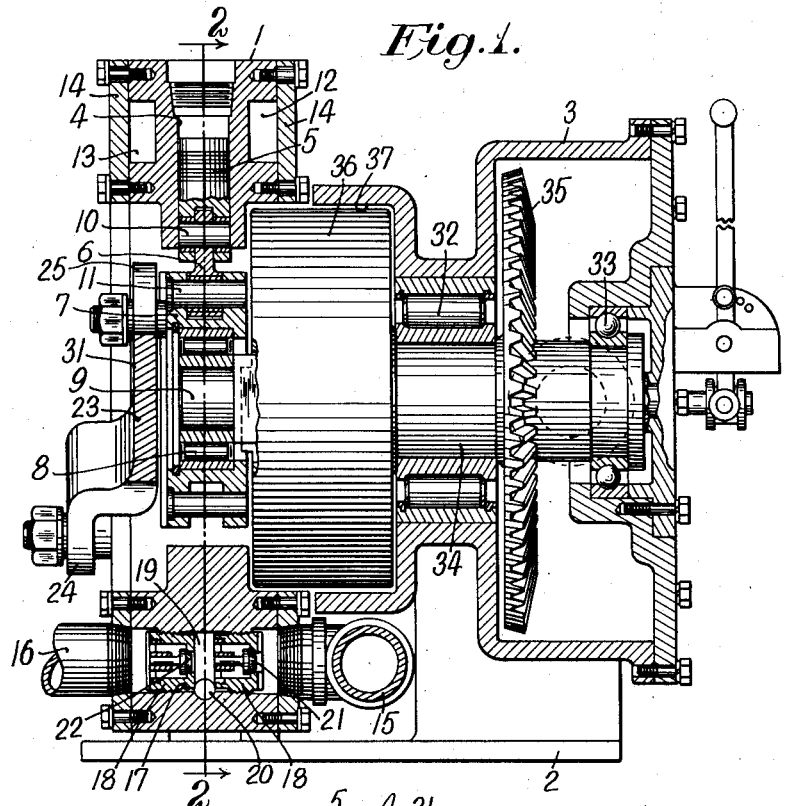
Fig. 1 is a central longitudinal vertical sectional view taken through an illustrative embodiment of the invention, the same being shown as incorporated in a radial cylinder pump and parts being shown in elevation to facilitate illustration.

As above noted, I have elected to illustrate the invention incorporated in a pump, although it will of course be apparent that it is equally applicable to motors. The pump in which the invention is embodied comprises a stationary casing I, generally in the form of an annulus, supported by a base 2. Also mounted on the base is a housing 3, enclosing certain elements of the drive mechanism, as will later appear. The casing I has a plurality of radially extending cylinder bores 4 respectively containing reciprocable pistons 5. These pistons are connected by relatively short connecting rods 6, to a ring member or annulus 7, journaled on a roller bearing 8 supported by a crank pin 9, by which the pistons are actuated. The connecting rods are pivotally connected to the pistons by pivot pins 10, and to the ring member 7 by pivot pins 11. The opposite side walls of the casing I are formed with annular recesses or grooves 12 and 13, and closing the open sides of these grooves are annular closure plates 14, 14, secured, as by bolts, to the casing. The groove 12 is an intake groove and the groove 13 is an exhaust groove, and the groove 12 is connected to a source of liquid supply, such as a liquid reservoir, through a pipe connection 15, while the groove 13 is connected by a pipe connection 16 to a suitable point of liquid pressure delivery. The pipe connections 15 and 16 are threadedly secured within openings in the inner and outer closure plates 14, 14 respectively, as shown in Fig. 1. Also formed in the casing I are transverse bores 17, one adjacent each cylinder bore, and closed at their outer ends by screw plugs 18, and the spaces 19 within the bores between the screw plugs communicate through passages 20 with the outer ends of the cylinder bores 4. The screw plugs 18 herein constitute valve cages in which are arranged conventional check valves 21 and 22, the former intake valves and the latter discharge valves. It will at once be seen that as the pistons 5 reciprocate within the cylinder bores 4, liquid is sucked in during the suction strokes of the pistons, through the intake groove 12 past the intake valves 21, and through the spaces 19 and passages 20 to the cylinder bores, and, during the working stroke of the pistons, is forced under pressure from the cylinder bores through the spaces 19, past the discharge valves 22, to the exhaust groove 13.

Now referring to the improved means for controlling the angular relation of the connecting rods 6, it will be observed that there is provided a member 23, preferably of generally cruciform shape, having a pair of relatively long arms 24, 24, and a pair of relatively short arms 25, 25 arranged at right angles to the long arms as shown in Figs. 3 and 6. These pairs of arms are radially slotted at 26 and 27 respectively, and received in the slots 26 are screw bolts 28 (see Fig. 5), threaded within the outer wall of the stationary casing 1, while received in one of the slots 27 is an elongation 29 of one of the connecting rod pins 11 (see Fig. 4) and in the other slot 27 is a pin 30 fixed to the ring member 7 intermediate a pair of connecting rod pins. It will thus be seen that as the pistons are reciprocated, the member 23 controls the position of the ring member 7 and effects an approximately equal angular movement of the connecting rods 6 to the opposite sides of the lines containing the axes of their respective pistons and causes the ends of the connecting rods connected to the ring member to traverse circles of the same diameter as the circle which the crank pin axis traverses, thereby to maintain the connecting rods in their most effective angular relation. It will be noted that the central portion 31 of the member 23 is arranged within the open center of the casing and lies in planes closely adjacent to the ring member 7, and the short arms 25 are straight and extend laterally from the central portion while the long arms 24 are outwardly bent.

Journaled within a roller bearing 32 and a ball bearing 33 supported within the housing 3, as shown in Fig. 1, is a crankshaft 34 having keyed thereto a bevel gear 35 arranged within the housing and constituting the pump driving gear. The crankshaft 34 has formed integral therewith a casing 36 herein partially enclosed within a recess 37 in the housing and partially in the open center of the pump casing 1, and the crank pin 9 is connected through crank pin adjusting means not shown to the casing 36. In Fig. 1 the crank pin is shown adjusted into a position wherein the axes of the crank pin and crankshaft are in coincidence, and in Fig. 2 the crank pin is in its most eccentric, maximum-stroke-effecting position with respect to the crankshaft axis, and the crank pin may be adjusted into any intermediate position between that shown in Fig. 1 and that shown in Fig. 2 so that the piston strokes may be varied by imperceptible degrees from zero to a maximum stroke. Since this stroke adjusting means does not enter into the present invention, further description and illustration thereof are herein unnecessary.

Figure 2:
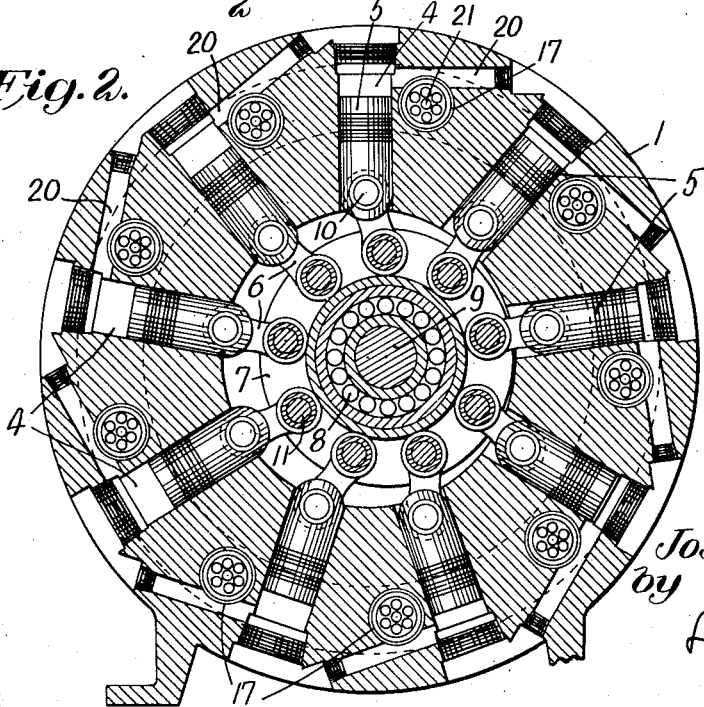
Fig. 2 is a cross sectional view taken substantially on line 2—2 of Fig. 1, with the crank pin in its maximum stroke effecting position.

The mode of operation of the pump will be clearly apparent from the description given. When the bevel gear 35 is driven in any suitable manner, and the parts are in the position shown in Fig. 1, the crankshaft 34 is rotated, rotating therewith the casing 36, and since at that time the axes of the crank pin 9 and the crankshaft are in coincidence, the crank pin merely revolves while the pump pistons 5 remain stationary within their cylinder bores, and no liquid displacement from the pump occurs. When it is desired to effect liquid displacement, the crank pin may be moved into a position wherein its axis is out of coincidence with the crankshaft axis, as shown in Fig. 2, thereby to cause reciprocation of the pistons 5 within the cylinder bores, and as the degree of eccentricity of the crank pin with respect to the crankshaft axis is varied, the stroke of the pistons is correspondingly varied. As the crank pin 9 is driven, the annulus 7 moves orbitally about the crankshaft axis, thereby to drive the pistons 5 through the connecting rods 6, and the angular relation of the connecting rods is controlled by the cruciform-shaped member 23, so that the angular movement of the connecting rods to opposite sides of the lines containing the axes of their pistons is the same, and the axes of the pins 11 for connecting the rods to the annulus traverse circles of a diameter equal to that of the circle which the crank pin traverses. As the annulus 7 moves orbitally, the control member 23 slides rectilinearly back and forth relative to its guide screws on the casing 1, and the slots 27 in the short arms 25 permit such orbital movement of the annulus while controlling the movement of the latter and the angle of the connecting rods.

As a result of this invention it will be noted that an improved cylinder and piston apparatus is provided having improved controlling means for the connecting rods whereby the angularity of the connecting rods is maintained in the most effective position. Furthermore, by the provision of the control member for controlling the angularity of the connecting rods, the connecting rods are maintained at their most effective angle. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a series of cylinders containing reciprocable pistons, a crank pin, an annulus surrounding said crank pin and in which the latter has a bearing, connecting rods connecting said annulus to said pistons, said pistons being operatively connected with said crankpin through said annulus and said connecting rods, and means including a member having a connection with said annulus providing for guided bodily movement of said annulus relative to said member, for preventing angular movement of said annulus upon its axis.

2. In combination, a series of cylinders having bores containing reciprocatory pistons, an annulus, means for guiding said annulus for movement in an orbital path, means for effecting orbital movement of said annulus, connecting rods connecting said annulus to said pistons, and means including a member guided for rectilinear movement and connected to said annulus for preventing angular movement of the latter upon its axis.

3. In a pump, the combination of a stationary annular casing having a series of radially located cylinder bores, pistons reciprocable in said bores, an annulus mounted centrally within said casing to move orbitally relative thereto, means for effecting orbital movement of said annulus, connecting rods connecting said annulus to said pistons, said pistons being driven by said annulus-moving-means through said annulus and said connecting rods, and means mounted on said casing and slidably connected to said annulus for preventing angular movement of the latter upon its axis.

4. In a pump, the combination of a stationary annular casing having a series of radially located cylinder bores, pistons reciprocable in said bores, an annulus mounted centrally within said casing to move orbitally relative thereto, means for effecting orbital movement of said annulus, connecting rods connecting said annulus to said pistons, said pistons being driven by said annulus-moving-means through said annulus and said connecting rods, and means guided for rectilinear movement on said casing and connected to said annulus for holding the latter against angular movement relative to said casing.

5. In a device of the character described, the combination comprising a cylinder block having bores, pistons reciprocable in said cylinder bores, a crankshaft having a crank pin, an annulus journaled on said crank pin, connecting rods for connecting said pistons to said annulus, said pistons being connected to said crank pin through said annulus and said connecting rods, and means slidably connected to said annulus and said cylinder block for preventing angular movement therebetween.

6. In a device of the character described, the combination comprising relatively reciprocable cylinder and piston elements, a crankshaft carrying a crank pin, an annulus journaled on said crank pin, connecting rods between said annulus and said reciprocable elements, said reciprocable elements being connected to said crank pin through said annulus and said connecting rods, and means for holding said annulus against angular movement about its own axis, said last mentioned means including a member having a sliding connection with said annulus.

7. In a pump, the combination of a stationary annular casing having a series of radially located cylinder bores, pistons reciprocable in said bores, an annulus mounted centrally within said casing to move orbitally relative thereto, means for effecting orbital movement of said annulus, connecting rods connecting said annulus to said pistons, said pistons being driven by said annulus-moving means through said annulus and said connecting rods, and means including a member guided for rectilinear movement on said casing and having a connection with said annulus providing for rectilinear movement therebetween, for holding the latter against angular movement relative to said casing.

8. In a pump, the combination of a stationary annular casing having a series of radially located cylinder bores, pistons reciprocable in said bores, an annulus mounted centrally within said casing to move orbitally relative thereto, means for effecting orbital movement of said annulus, connecting rods connecting said annulus to said pistons, said pistons being driven by said annulus-moving means through said annulus and said connecting rods, and means including a member guided for rectilinear movement on said casing and having a connection with said annulus providing for rectilinear movement therebetween at right angles to the direction of movement between said member and said casing, for holding said annulus against angular movement relative to said casing.

9. In a cylinder and piston mechanism, the combination of a casing having a plurality of cylinder bores, pistons reciprocable in said bores, an annulus mounted within said casing to move orbitally relative thereto, connecting rods connecting said annulus to said pistons whereby piston reciprocation and orbital movement of said annulus concur, and means mounted on said casing and including a member having a connection with said annulus providing for guided bodily movement therebetween, for preventing angular movement of said annulus upon its axis.

JOSEPH F. JOY.